United States Patent [19]

Mariano et al.

[11] Patent Number: 5,171,766
[45] Date of Patent: Dec. 15, 1992

[54] MODELING DOUGH

[75] Inventors: Karen M. Mariano, Easton; Richard E. Miller, Nazareth, both of Pa.

[73] Assignee: Binney & Smith Inc.

[21] Appl. No.: 734,951

[22] Filed: Jul. 24, 1991

[51] Int. Cl.$^5$ .............. C08J 9/32; C08K 3/26; C08L 29/04
[52] U.S. Cl. .................. 523/218; 523/204; 523/207; 524/503; 524/557; 524/803; 524/425
[58] Field of Search .............. 523/204, 207, 218; 524/425, 503, 557, 803

[56] References Cited

U.S. PATENT DOCUMENTS

| | | | |
|---|---|---|---|
| 3,135,648 | 6/1964 | Hawkins | 524/557 |
| 3,143,518 | 8/1964 | Smith et al. | 524/557 |
| 3,558,340 | 1/1971 | Spector | 117/26 |
| 3,607,332 | 9/1971 | Wingfield | 106/243 |
| 3,632,786 | 1/1972 | Nickerson | 524/503 |
| 3,714,086 | 1/1973 | Schaefer et al. | 524/557 |
| 3,873,485 | 3/1975 | Fichera | 260/29.2 EP |
| 3,886,112 | 5/1975 | Watson et al. | 260/33.4 R |
| 4,094,694 | 6/1978 | Long | 424/557 |
| 4,336,071 | 6/1982 | Schnorrer | 106/170 |
| 4,469,837 | 9/1984 | Cattaneo | 524/388 |

FOREIGN PATENT DOCUMENTS

| | | | |
|---|---|---|---|
| 0075934 | 4/1983 | European Pat. Off. | |
| 0041748 | 4/1976 | Japan | 524/405 |
| 0154411 | 12/1979 | Japan | 524/405 |
| 0036538 | 4/1981 | Japan | |
| 1060636 | 12/1983 | U.S.S.R. | 523/218 |

Primary Examiner—Paul R. Michl
Assistant Examiner—Peter Szekely
Attorney, Agent, or Firm—Leydig, Voit & Mayer

[57] ABSTRACT

A modeling dough comprising gelled poly(vinyl alcohol), water and a filler provides a dough resistant to flaking, cracking, and crumbling. In the disclosed invention, the poly(vinyl alcohol) resin is gelled, thereby providing a water-based resin system that is not sticky yet very ductile. Prior to drying, the dough also exhibits the properties of bounceability and the ability to pick up newsprint. After the dough is air-dried, the poly(vinyl alcohol) resin serves to bind the components into a solid, durable product. The filler accounts for a large portion of the volume of the dough, so the overall volume is not greatly affected by water loss upon drying. The dough is water-based and easy to wash from skin, carpets, and other surfaces. Dyes and pigments can be easily incorporated into the formula. The dried product is sandable, carveable and paintable.

13 Claims, No Drawings

MODELING DOUGH

FIELD OF THE INVENTION

The present invention relates to an improved water-based modeling dough for use by children and artists in general. Specifically, the present invention relates to an improved water-based modeling dough having a gelled poly(vinyl alcohol) resin and a filler, which bind to form a matrix. The present invention provides an improved water-based modeling dough which forms a solid, lightweight, durable product upon drying.

BACKGROUND OF THE INVENTION

The present invention does not relate to oil-based clays comprising naturally occurring clays that are mined as rocks. Rather, the present invention relates to man-made, water-based modeling doughs.

Non oil-based modeling doughs are normally air-dryable and incorporate starch as the filler. These doughs have a tendency to flake, crack, and crumble in both the wet and dry stages. These doughs also shrink substantially upon drying. In other words, these doughs are characterized by poor plasticity, poor dry strength and substantial drying shrinkage.

Plasticity is the property of a wet dough or clay that permits deformation by application of a relatively slight pressure and retention of the deformed shape after release of the pressure. This property distinguishes the dough in its wet stage from its dry stage. When wet, starch-based modeling doughs have a low plasticity and have a tendency to break apart during the molding or manipulating process. These doughs also have a tendency to crack when dry and are not easily shaped in the dry state by sanding or filing. Furthermore, the artist cannot easily add wet dough to the existing dried sculpture. Finally, artists cannot carve dried starch-based doughs.

Another problem inherent with water-based doughs is the loss of volume (shrinkage) upon drying. Because water accounts for a large portion of the volume of the dough in its wet stage, water loss upon drying results in a loss of volume in the resulting molded product.

One attempt to overcome the shrinkage problem has been to incorporate large proportions of filler in the dough mixture, but there is still shrinkage because the volume decreases as the filler binds together upon drying. One commercially available children's modeling dough, for example, shrinks about twenty percent upon drying despite its high filler content. In other words, a sculpture made with that dough can lose about twenty percent of its total volume upon drying. Moreover, the use of large proportions of filler aggravates the flaking, cracking and crumbling problem discussed above, and also tends to decrease the dry strength of the molded sculpture.

Discoloration upon drying is another problem associated with water-based doughs and is compounded by the dry shrinkage discussed above. As the volume decreases, the concentration of the pigment increases and the color darkens.

Yet another problem associated with conventional water-based doughs is that they are heavy and hard to manipulate. Dense, heavy doughs are awkward and the child or artist is limited in the types of shapes that can be created without the dough falling apart.

Finally, presently available water-based doughs are destructive to textiles, carpeting, furniture and other surfaces. They tend to stain a surface and are not easily removed by washing.

In light of the above problems, the need arises for a water-based air-drying dough that is easily washed from textiles, carpeting and other surfaces. Furthermore, the water-based, air-drying dough must be able to incorporate dyes and pigments and not discolor upon drying.

SUMMARY OF THE INVENTION

The discovery of the present invention is that one may formulate a superior modeling dough by combining gelled poly(vinyl alcohol) resin, a filler and water to form a cohesive water soluble resin system. The water evaporates upon drying to leave a gelled poly(vinyl alcohol)-filler matrix that is both lightweight and durable.

In one preferred form, the composition of the invention includes from about 4 to about 15 percent poly(vinyl alcohol), from about 0.2 to about 2 percent gellant, from about 45 to about 60 percent water and from about 10 to about 30 percent filler.

Optionally, the composition of the invention may include one or more of a buffer, a defoamer, a wetting agent, a humectant, a preservative, and colorants.

When the preferred fillers are used, the doughs disclosed have a density of less than 0.48 g/cc. Previously known water-based doughs incorporating starch as the filler have a density of about 1.25 g/cc. and natural clays have densities of 2.50 g/cc. Thus, the dough disclosed by the present invention is substantially lighter than modeling doughs and clays previously available. Further, the doughs disclosed by the present invention have a very limited amount of dry shrinkage, are extrudable when wet, and are sandable, carvable, and paintable when dry.

Therefore, one general object of the invention is to provide a lightweight water-based air-drying modeling dough that contains a cohesive water-soluble resin system and that is resistant to flaking, cracking, and crumbling.

A further object of the invention is to provide a lightweight water-based air-drying modeling dough that does not substantially shrink in volume upon drying.

Another object of the invention is to provide a water-based air-drying modeling dough incorporating a gelled resin with a high degree of plasticity, wet ductility, and extrudability, yet a low degree of stickiness in the wet product.

Yet another object of the invention is to provide a water-based air-drying modeling dough that is sandable and carvable after drying.

A still further object of the invention is to provide a water-based air-drying modeling dough that enables the artist to add wet dough to the existing dried sculpture.

An additional object of the invention is to provide a water-based air-drying modeling dough with the ability to pick up newsprint.

Another object of the invention is to provide a water-based, air-drying modeling dough incorporating dyes, colorants and pigments and which does not discolor upon drying.

Yet another object of the invention is to provide a water-based air-drying modeling dough with the ability to bounce.

And, another object of the invention is to provide a water-based air-drying modeling dough that is more easily washed from skin, carpeting, textiles and other surfaces compared to other modeling compounds.

Further and additional objects will appear from the description and appended claims.

DETAILED DESCRIPTION

To achieve the foregoing and other objects in accordance with the purposes of the present invention, as embodied and broadly claimed herein, the modeling dough disclosed in the present invention comprises from about 45 to about 60% water, from about 4 to about 15% poly(vinyl alcohol) resin, from about 10 to about 30% filler and from about 0.2 to about 2% gellant.

The poly(vinyl alcohol) resin binds with the filler upon drying, thereby avoiding the flaking, cracking and crumbling problems associated with prior compositions. The poly(vinyl alcohol) gives the dough its ductility and plasticity qualities while wet.

However, employing poly(vinyl alcohol) as a resin can result in a dough that is sticky and hard to manipulate. Therefore, a gellant, such as a water soluble borate salt, in an amount of about 0.2 to about 2 weight percent, is used to substantially gel the resin, eliminate stickiness, and impart wet ductility to the resulting dough. Most water soluble borate salts are acceptable, though sodium tetraborate is the preferred gellant, because it also acts as a buffer to maintain the pH of the system at a level high enough to permit gelling of the poly(vinyl alcohol). Other workable gellants include, but are not limited to, resorcinol, catechol, gallic acid, 2-4-dihydroxy benzoic acid and congo red dye.

Poly(vinyl alcohol) is a cream-colored powder which is soluble in water and insoluble in most organic solvents. It is made by the hydrolysis of poly(vinyl acetate) and contains from about 1% to about 22% acetyl groups.

Poly(vinyl alcohol) may be partially or fully hydrolyzed. It varies in molecular weight according to the length of the resin chain. Both the degree of hydrolyzation and molecular weight independently affect the thermal stability of the dough.

The thermal stability of poly(vinyl alcohol) increases as both the degree of hydrolyzation and molecular weight increases. The disclosed modeling dough that is made with a more fully hydrolyzed grade of poly(vinyl alcohol) and/or a higher molecular weight of poly(vinyl alcohol) has a better thermal stability than a dough made with poly(vinyl alcohol) that is less hydrolyzed and/or has a lower molecular weight.

Thermal stability testing is done at 60° C. (140° F.) for ten days, since these conditions have been adopted by the paint and coatings industry as an approximation of three years of shelf-life. The dough should show little change in consistency, functionality and color.

If the molecular weight of the poly(vinyl alcohol) is too low, the dough will not pass thermal stability testing. However, if the degree of hydrolysis is too high, the dough may be thermally stable but is too crumbly and brittle and does not perform acceptably. A proper balance is struck by either a medium molecular weight (85,000–146,000), partially hydrolyzed (87–89%) poly(vinyl alcohol) or a near fully hydrolyzed (96.5–97.5%) low/medium molecular weight (31,000–146,000) poly(vinyl alcohol). These resin grades are the preferred resin grades because they impart better thermal stability coupled with acceptable performance properties. Among the useful poly(vinyl alcohol) resins are those sold under the tradenames Airvol 523 and Airvol WS42 by Air Products & Chemicals, Inc. and Elvanol 52-22 by E. I. duPont de Nemours and Company.

If bounceability of the dough is a requisite feature of the product, then a lower molecular weight, partially hydrolyzed poly(vinyl alcohol) such as Airvol 203 or Airvol 205 should be used. This resin grade also produces doughs that are especially resistant to cracking. However, doughs made with this resin grade have reduced thermal stability and will consequently have a shorter shelf-life.

Dry shrinkage is another problem inherent in water-based doughs disclosed in the prior art and overcome by the present invention. The present invention overcomes this problem by incorporating a filler that bonds with the gelled poly(vinyl alcohol) resin to form an adequate matrix. The water evaporates upon drying without substantial shrinkage to the sculpture or other molded object. Workable fillers, in the amount of 10 to 30 weight percent, include hollow composite microspheres, inert talcs, calcium carbonate, mica, clay or ceramic particles and combinations thereof.

The hollow composite microspheres are the preferred filler primarily because of the low cost. They are functionally desirable because they are lightweight (having a density of about 0.13 g/cc) and lower the density of the modeling dough.

The hollow composite microsphere filler incorporated into the modeling dough disclosed by the present invention is especially helpful in preventing the molded object or sculpture from shrinking upon drying While the weight percent of water in the present invention is high (45 to 65%), the actual partial volume of water is relatively low due to the relatively high density of water (1.0 g/cc) and low density of the microspheres. Consequently, the hollow microspheres constitute the majority of the volume of the dough. The poly(vinyl alcohol) and the microspheres bind together to give a sufficient structural integrity for molding. Thus, when the water evaporates, the dough does not lose a large percentage of its total volume.

The preferred filler consists essentially of hollow composite microspheres of about 50 micron diameter and having a wettable particulate coating. Microspheres with a larger diameter are workable but may give the dough a grainy texture. Microspheres with a smaller diameter may result in a heavier dough but result in a smoother texture. Thus, the choice of particle size is determined by the desired end properties.

The microsphere coating facilitates the wetting of the microspheres by the liquid ingredients of the dough. The coating also contributes to the smooth feel and inhibits stickiness in the final product, thereby allowing easy manipulation. The preferred coating is calcium carbonate. Other coatings include talc, alumina trihydrate, and titanium dioxide, as well as functional components such as pigments and dyes.

One preferred coated microsphere is sold under the tradename Dualite ™ M6001AE by Pierce & Stevens. M6001AE is an ultra-low density, resilient, polymeric microsphere coated with calcium carbonate. It is a lightweight filler that reduces density of the dough and occupies the volume not attributable to water and resin. The resilient polymeric microspheres are shear stable and impact resistant, thus remaining intact under formulation conditions. Other hollow composite microsphere fillers useful in the composition of the invention have densities ranging from 0.10 to 0.75 g/cc, and include the wettable particulate coatings discussed above.

Other workable microspheres are available in various sizes and densities. Ceramic microspheres range in diameter from 15 to 40 microns and have a density of about 0.7 g/cc. However, the ceramic microspheres give the dough a grainier texture and a brownish coloring. Silica alumina alloy microspheres range in diameter from 1 to 100 microns and have densities ranging from 2.1 to 2.5 g/cc, depending upon the wall thickness. Plastic microspheres made from a variety of materials are available in sizes ranging from 1 to 1000 micron diameter and densities ranging from 0.13 to 0.95 g/cc. Any of these materials, or combinations of such materials, may be employed for the purpose of achieving particular combinations of properties.

The preferred composition of the modeling dough disclosed by the present invention incorporates six additional optional components: (1) a defoamer; (2) a wetting agent or dispersant; (3) a humectant; (4) a preservative; (5) a colorant; and (6) a buffer.

A defoamer is used to eliminate air bubbles upon mixing of the components, and such additives are readily available from numerous sources. The amount of defoamer is not critical, though such materials are typically used in amounts of from about 1 to 2% by weight. Balab Bubblebreaker 748, an aliphatic oil and surfactant mixture, or any other of the commercially available defoamers are equally suitable.

The wetting agent promotes dispersion of the microspheres and of any particulate colorant during the mixing of the disclosed modeling dough, and such materials are well known. One preferred wetting agent is sold under the tradename Nopcosperse 44 by Henkel, a non-ionic polyelectrolyte. The preferred weight percent of wetting agent is from about 0 to about 2%.

The humectant is not an essential component, but it is preferably added to help plasticize the poly(vinyl alcohol). Without the humectant, the disclosed modeling dough may be more brittle and the use of a humectant improves the workability of the disclosed modeling dough. There is a wide variety of workable humectant materials, however, the preferred humectants are triglycerol and glycerin because they are superior plasticizers in this sytem and produce a dough with a smooth texture. Alternative, yet satisfactory, humectants are propylene glycols, poly(ethylene glycols) (i.e. Carbowax 200) and diethylene glycol. The humectant may be present in an amount of from about 0 to about 20% by weight.

A desirable additive that increases shelf-life is a preservative, and a wide variety of such materials is available commercially. One preferred preservative is Kathon LX1. 5, a 1.5% solution of isothiazolines. The preferred weight percent of preservative is from about 0.15 to about 0.75%.

If no colorant is used, the resulting dough is white. A white dough has many applications because it can be easily painted with water-base paints. Also, white is an attractive color in itself and has many applications without the need for painting. If a colored dough is desired, a variety of pigments and dyes may be used. Fluorescent doughs are especially attractive to children. Fluorescent pigments that work especially well include those sold under the trade names Aurora Pink Z-11-3, Saturn Yellow Z-17-N and Signal Green Z-18-3.

A buffer may also be added to raise the pH in some formulations. When the pH is below 7.0, the poly(vinyl alcohol) does not gel properly. If boric acid is used as the gellant, it tends to lower the pH and creates the need for a buffer. Also, formulations using low molecular weight, partially hydrolyzed poly(vinyl alcohol) resins are acidic and require a buffer. However, one appropriate buffer is sodium tetraborate, which is also the preferred gellant. None of the examples disclosed below contain a buffer other than the sodium tetraborate gellant because the pH levels are sufficiently high. Alternative buffers, when needed due to a pH below 7.0, include 2-amino-2-methyl-1-propanol and sodium bicarbonate. The preferred amount of this additive, when used, is from about 0 to about 1% by weight.

EXAMPLES

While only three example formulations are set forth below, alternative formulations will be apparent to those skilled in the art who will be able to modify the formula with an eye toward the desired performance properties and intended use, both of which may vary widely. The evaluation of any single formulation is therefore inherently subjective.

When altering the formulas disclosed below it is important to maintain a pH level near 7.5 or higher. Doughs with a pH below 7.0 may ungel and become sticky and difficult to handle. As stated above, a buffer may alleviate this problem.

The modeling doughs disclosed by the present invention are made by first dissolving the poly(vinyl alcohol) resin in water to form about a 20% solution. The solution must be heated (185° F.) to get the poly(vinyl alcohol) to dissolve. Then, the rest of the liquid components, except the gellant, are blended in a mixer. An aqueous solution of the gellant is added last. Agitation should be stopped before the microspheres are added because they are very light and aerate easily. The mixture should be covered before agitation is restarted. Once a homogenous, creamy mixture is obtained, the gellant is added.

Sodium tetraborate, the preferred gellant, is dissolved in water to form a 2 to 4% solution. Higher concentrations require heat to dissolve the sodium tetraborate. The solution should be added dropwise and slowly over the creamy mixture as it is blended. The amount of gellant added is determined by the preferred texture and softness of the final product.

The modeling doughs disclosed by the present invention have a drying time of about 24 to about 48 hours and a shelf-life (in the wet state) of about 2 years at room temperature.

Modeling doughs disclosed by the present invention were produced by mixing the following components, the amounts being expressed in weight percent:

EXAMPLE 1

| Component | Amount |
|---|---|
| Airvol WS42 medium/low molecular weight 96.5–97.5% hydrolyzed | 7.46 |
| water | 54.57 |
| Dualite ™ microspheres | 22.72 |
| sodium tetraborate | 0.51 |
| Balab Bubblebreaker 748 | 1.10 |
| Nopcosperse 44 | 0.55 |
| glycerin | 12.94 |
| Kathon LX1.5 | 0.15 |
| | 100.00 |

The modeling dough of Example 1 is not sticky and is easy to manipulate. It has a somewhat powdery texture. However, the dried structure is fairly brittle and the wet dough is not very ductile. The wet dough has a density of 0.41 g/cc. and a pH of 7.51.

EXAMPLE 2

| Component | Amount |
| --- | --- |
| Airvol 205 medium/low molecular weight 87-89% hydrolyzed | 10.76 |
| water | 56.79 |
| Dualite ™ microspheres | 17.34 |
| sodium tetraborate | 0.28 |
| Balab Bubblebreaker 748 | 1.78 |
| Nopcosperse 44 | 0.89 |
| triglycerol | 12.01 |
| Kathon LX1.5 | 0.15 |
| | 100.00 |

The dough of Example 2 exhibits excellent bounceability, has excellent plasticity, is very ductile and is resistant to cracking. The dried dough is strong. However, the wet doug is not as thermally stable as the dough disclosed in Example 1 and, therefore, has a shorter shelf-life. The wet dough has a density of 0.45 g/cc and a pH of 7.66.

EXAMPLE 3

| Component | Amount |
| --- | --- |
| Airvol 523 medium molecular weight 87-89% hydrolyzed | 8.60 |
| water | 48.64 |
| Dualite ™ microspheres | 25.50 |
| sodium tetraborate | 0.28 |
| Balab Bubblebreaker 748 | 1.27 |
| Nopcosperse 44 | 0.64 |
| glycerin | 14.92 |
| Kathon LX1.5 | 0.15 |
| | 100.00 |

The dough of Example 3 is fairly ductile, has good plasticity and the dried dough has good strength. The wet dough has a density of 0.37 g/cc. and a pH of 7.48. The dough disclosed in Example 3 is the preferred dough because of its performance properties and thermal stability.

All of the doughs disclosed are easily washed from skin, carpeting, textiles and other surfaces. In fact, the modeling dough disclosed by the present invention acts to clean the skin if the dough is pressed against the skin and then removed. Similarly, the disclosed modeling dough exhibits the ability pick up newsprint.

While specific weight percent ranges of the components of preferred compositions have been set forth in this disclosure, the specific proportions of the components are not narrowly critical to the practice of the present invention.

From the foregoing description and examples, it is apparent that the objects of the present invention have been achieved. While only certain embodiments have been set forth, alternative embodiments and various modifications will be apparent to those skilled in the art. These and other alternatives are considered equivalents and within the spirit and scope of the present invention.

What is claimed:

1. A moldable composition comprising poly(vinyl alcohol), water, a gellant, and a filler, said filler consisting essentially of plastic microspheres having a wettable particulate coating.

2. The composition of claim 1, wherein said wettable particulate coating comprises calcium carbonate.

3. A moldable composition comprising, by weight: from about 4% to about 15% poly(vinyl alcohol), from about 45% to about 60% water, from about 10% to about 30% filler, from about 1% to about 2% defoamer, from 0% to about 2% wetting agent, from about 0.2% to about 2% gellant, from 0% to about 20% humectant, from 0% to about 4% colorant, and from 0%, to about 2% preservative, said filler consisting essentially of plastic microspheres having a wettable particulate coating.

4. The composition of claim 3, wherein said wettable particulate coating comprises calcium carbonate.

5. A water soluble moldable composition comprising, by weight, about 9 percent poly(vinyl alcohol), about 0.3 percent sodium tetraborate, about 25 percent coated plastic microspheres, about 49 percent water, about 1 percent defoamer, about 1 percent wetting agent, about 15 percent glycerin, and less than about 1 percent preservative.

6. The composition of claim 5, wherein said poly(vinyl alcohol) is at least partially hydrolyzed.

7. The composition of claim 5, wherein said coated plastic microspheres have a wettable particulate coating.

8. The composition of claim 2, wherein said wettable particulate coating of said plastic microspheres is calcium carbonate.

9. A water-based moldable composition comprising, by weight, from about 4 to about 15 percent poly(vinyl alcohol), from about 10 to about 30 percent filler, and from about 0.2 to about 2 percent gellant.

10. A moldable composition comprising poly(vinyl alcohol), water, a gellant, and a filler, wherein said filler consists essentially of plastic microspheres having a density of from about 0.10 to about 0.75 g/cc, said plastic microspheres having a wettable particulate coating.

11. The composition of claim 10, wherein said wettable particulate coating comprises calcium carbonate.

12. A water-based moldable composition comprising, by weight: from about 4% to about 15% poly(vinyl alcohol), from about 45% to about 60% water, from about 10% to about 30% filler, from about 1% to about 2% defoamer, from 0% to about 2% wetting agent, from about 0.2% to about 2% gellant, from 0% to about 20% humectant, from 0% to about 4% colorant, and from 0% to about 2% preservative, wherein said filler consists essentially of plastic microspheres having a wettable particulate coating.

13. The composition of claim 12, wherein said wettable particulate coating comprises calcium carbonate.

* * * * *

UNITED STATES PATENT AND TRADEMARK OFFICE
CERTIFICATE OF CORRECTION

PATENT NO. : 5,171,766
DATED : December 15, 1992
INVENTOR(S) : Mariano et al

It is certified that error appears in the above-indentified patent and that said Letters Patent is hereby corrected as shown below:

On the title page: Item [56] Reference Cited

"4,094,694 6/1978 Long .......424/557" should read
-- 4,094,694 6/1978 Long ....524/557

Column 4, line 32 after "drying" insert --.--.

Column 8, line 36, claim 8, "2" should read --7--.

Signed and Sealed this

Twenty-sixth Day of October, 1993

Attest:

Attesting Officer

BRUCE LEHMAN

Commissioner of Patents and Trademarks